(12) United States Patent
Pate

(10) Patent No.: US 10,423,229 B2
(45) Date of Patent: Sep. 24, 2019

(54) ADJUSTING MOVEMENT OF A DISPLAY SCREEN TO COMPENSATE FOR CHANGES IN SPEED OF MOVEMENT ACROSS THE DISPLAY SCREEN

(71) Applicant: Google LLC, Mountain View, CA (US)

(72) Inventor: Michael Scot Pate, Pleasanton, CA (US)

(73) Assignee: Google LLC, Mountain View, CA (US)

( * ) Notice: Subject to any disclaimer, the term of this patent is extended or adjusted under 35 U.S.C. 154(b) by 81 days.

(21) Appl. No.: 15/679,573

(22) Filed: Aug. 17, 2017

(65) Prior Publication Data

US 2019/0056786 A1     Feb. 21, 2019

(51) Int. Cl.
*G06F 3/041*     (2006.01)
*G06F 3/01*      (2006.01)

(52) U.S. Cl.
CPC .............. *G06F 3/016* (2013.01); *G06F 3/041* (2013.01); *G06F 3/0414* (2013.01); *G06F 2203/04105* (2013.01)

(58) Field of Classification Search
CPC ................... G06F 3/016; G06F 3/0414; G06F 2203/04105
See application file for complete search history.

(56) References Cited

U.S. PATENT DOCUMENTS

| | | |
|---|---|---|
| 4,391,124 A | 7/1983 | Drost et al. |
| 4,675,835 A | 6/1987 | Pfleiderer |
| RE40,891 E * | 9/2009 | Yasutake ............... G06F 3/0338 178/18.01 |
| 8,044,941 B2 * | 10/2011 | Pryor ..................... G06F 3/011 178/18.01 |

(Continued)

FOREIGN PATENT DOCUMENTS

| | | |
|---|---|---|
| CN | 101981532 | 2/2011 |
| TW | 201020889 | 6/2010 |

(Continued)

OTHER PUBLICATIONS

International Search Report and Written Opinion issued in International Application No. PCT/US2018/030365, dated Jun. 22, 2018, 13 pages.

(Continued)

*Primary Examiner* — Ricardo Osorio
(74) *Attorney, Agent, or Firm* — Fish & Richardson P.C.

(57) ABSTRACT

Methods, systems, and apparatus, including computer programs encoded on a computer storage medium, that move a display screen to produce sound or haptic feedback. A first force that causes a first movement of a first portion of a display screen is applied by a first transducer that is mechanically coupled to the first portion of the display screen. A movement of a second portion of the display screen is detected by a second transducer that is mechanically coupled to the second portion. A relationship between the first movement caused at the first portion of the display screen by the first transducer and the movement detected at the second portion of the display screen by the second transducer is determined. A second force that causes a second movement of the first portion of the display screen is applied by the first transducer, the second force being determined using the determined relationship.

19 Claims, 6 Drawing Sheets

(56) References Cited

U.S. PATENT DOCUMENTS

| | | | |
|---|---|---|---|
| 8,884,730 B2 * | 11/2014 | Lauder | H01F 7/04 |
| | | | 206/320 |
| 9,560,460 B2 | 1/2017 | Chaikin et al. | |
| 2002/0030663 A1 | 3/2002 | Tierling et al. | |
| 2002/0146136 A1 | 10/2002 | Carter | |
| 2005/0254662 A1 | 11/2005 | Blank et al. | |
| 2006/0119573 A1 | 6/2006 | Grant et al. | |
| 2006/0290662 A1 | 12/2006 | Houston et al. | |
| 2012/0068942 A1 * | 3/2012 | Lauder | H01F 7/04 |
| | | | 345/173 |
| 2018/0275810 A1 * | 9/2018 | Khoshkava | G06F 3/0414 |

FOREIGN PATENT DOCUMENTS

| | | |
|---|---|---|
| TW | 201322086 | 6/2013 |
| WO | 2009/120926 | 10/2009 |
| WO | 2010/104953 | 9/2010 |

OTHER PUBLICATIONS

TW Office Action in Taiwanese Appln. No. 107123501, dated May 3, 2019, 19 pages (with English translation).

* cited by examiner

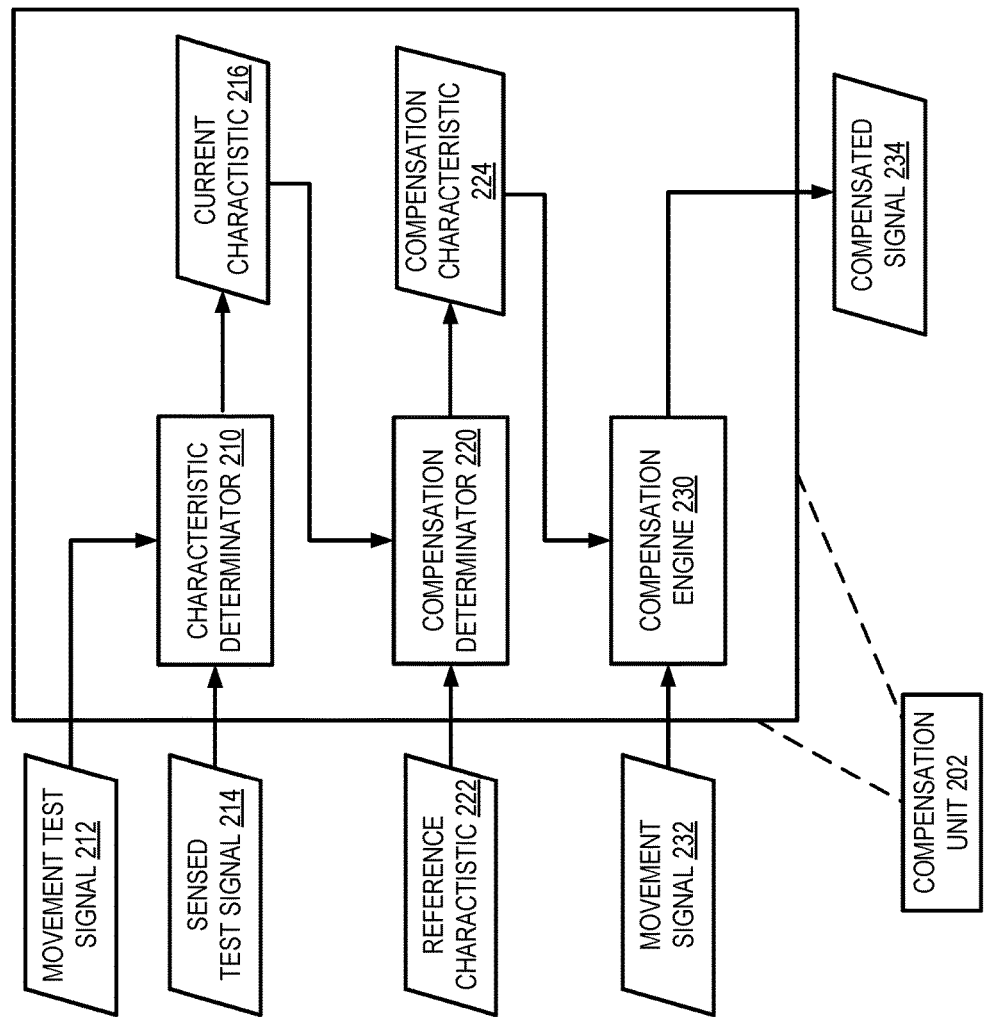

ADJUSTING MOVEMENT OF A DISPLAY SCREEN TO COMPENSATE FOR CHANGES IN SPEED OF MOVEMENT ACROSS THE DISPLAY SCREEN

BACKGROUND

Electronic devices may provide output to users in the form of audio or haptic feedback. More specifically, a transducer included in a consumer electronic device can move at least a portion of the consumer electronic device to produce the audio or haptic feedback.

SUMMARY

This document describes techniques, methods, systems, and other mechanisms that move a display screen to produce sound or haptic feedback. For example, a mobile computing device may be configured to vibrate a display screen of the mobile computing device at different frequencies and different intensities to produce sound at different frequencies and different intensities.

Such a display screen may be moved by the application of an input (e.g., an electrical signal) to a transducer attached to a portion of the display screen. The transducer may convert the input into force that causes movement at the portion of the display screen. In such a configuration, the movement at the portion of the display screen can then spread across the rest of the display screen. For example, movement at the top half of the display screen, caused by force from the transducer, may spread to the bottom half of the display screen.

However, changes to the spread of movement across the display screen may change the sound or haptic feedback perceived by a user. For example, a reduction in the spread of vibrations across a display screen may reduce the intensity of sound produced by the display screen.

The spread of movement across a display screen may change for a number of reasons. For example, a crack formed in the display screen may reduce the spread of vibrations across the portions of the display screen separated by the crack. In another example, a screen protector attached to the display screen may dampen the spread of vibrations across the display screen. In yet another example, a case for a mobile computing device that touches the edges of the display screen of the mobile computing device may dampen the spread of vibrations near the edges of the display screen.

To account for changes in the spread of movement across a display screen, a mobile computing device may be configured to adjust forces applied to a portion of the display screen. For example, in some embodiments of the disclosed technology, the mobile computing device may be configured to double a force applied by a transducer to a portion of the display screen to compensate for a reduction in the spread of movement across the display screen.

in some embodiments, the mobile computing device may be configured to compensate for such changes to the spread of movement across the display screen by determining a relationship between movement caused at a first portion of the display screen and movement detected at a second portion of the display screen and then applying force to the first portion of the display screen based on the determined relationship.

For example, a mobile computing device may determine that the amplitude of movement of a first portion of a display screen resulted in only half the expected amplitude of movement at a second portion of the display screen and, in response, apply double the amount of force to the first portion of the display screen. In another example, the mobile computing device may determine that a frequency of movement at a first portion of a display screen resulted in a different frequency than that expected at a second portion of the display screen and, in response, apply force to the first portion of the display screen at a different frequency.

Particular embodiments of the disclosed technology can, in certain instances, provide more consistent audio or haptic feedback to a user through movement of a display screen even when the spread of movement across the display screen has changed (e.g., due to the display screen having cracked, a screen protector being applied to the display screen, or a case for the mobile computing device coming into contact with the display screen).

One innovative aspect of the subject matter described in this specification is embodied in methods that include the actions of applying, by a first transducer that is mechanically coupled to a first portion of a display screen of a mobile computing device, a first force that causes a first movement of the first portion of the display screen, detecting, by a second transducer that is mechanically coupled to a second portion of the display screen, movement of the second portion of the display screen, the second portion of the display screen being different than the first portion of the display screen, determining a relationship between the first movement caused at the first portion of the display screen by the first transducer and the movement detected at the second portion of the display screen by the second transducer, and applying, by the first transducer, a second force that causes a second movement of the first portion of the display screen, the second force being determined by a computing system of the mobile computing device using the determined relationship between the first movement caused at the first portion of the display screen by the first transducer and the movement detected at the second portion of the display screen by the second transducer.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. For instance, the first transducer may include a first piezoelectric element that is mechanically coupled to the first portion of the display screen and the second transducer may include a second piezoelectric element that is mechanically coupled to the second portion of the display screen. Applying, by a first transducer that is mechanically coupled to a first portion of a display screen of a mobile computing device, a first force that causes a first movement of the first portion of the display screen may include applying a first force that causes the display screen to vibrate at a particular frequency and a particular amplitude.

Determining a relationship between the first movement caused at the first portion of the display screen by the first transducer and the movement detected at the second portion of the display screen by the second transducer may include determining a transfer function that describes a transfer of movement from the first portion of the display screen to the second portion of the display screen. Determining the transfer function that describes the transfer of movement from the first portion of the display screen to the second portion of the display screen may include determining a transfer function that describes an expected amplitude, frequency, and phase of movement at the second portion in response to a given amplitude, frequency, and phase of movement at the first portion. Applying, by the first transducer, a second force that causes a second movement of the first portion of the display screen, the second force being determined by a computing system of the mobile computing device using the determined relationship between the first movement caused at the first portion of the display screen by the first transducer and the movement detected at the second portion of the display screen by the second transducer may include obtaining a reference transfer function that describes a transfer of movement from a first portion of a reference display screen to a second portion of the reference display screen, determining a compensation function that compensates for a difference between the transfer function and the reference function, and applying the second force based at least on the compensation function.

Applying the second force based at least on the compensation function may include obtaining a movement signal, generating a compensated movement signal from the movement signal in accordance with the compensation function, and applying the second force in accordance with the compensated movement signal. Actions may include obtaining the reference transfer function before applying the first force. Actions may include determining to provide a perceivable output to a user of the mobile computing device through the first transducer, where applying the first force that causes a first movement of the first portion of the display screen is in response to determining to provide the perceivable output to the user of the mobile computing device through the first transducer. Determining a relationship between the first movement caused at the first portion of the display screen by the first transducer and the movement detected at the second portion of the display screen by the second transducer may include determining a relationship between an electric signal input to the first transducer and an electric signal generated by the second transducer.

Details of one or more implementations are set forth in the accompanying drawings and the description below. Other features, objects, and advantages will be apparent from the description and drawings, and from the claims.

DESCRIPTION OF DRAWINGS

FIG. 2 is a block diagram of a compensation unit that modifies movement of a display screen to compensate for changes in the spread of movement across the display screen.

Like reference symbols in the various drawings indicate like elements.

DETAILED DESCRIPTION

Figure 1A:
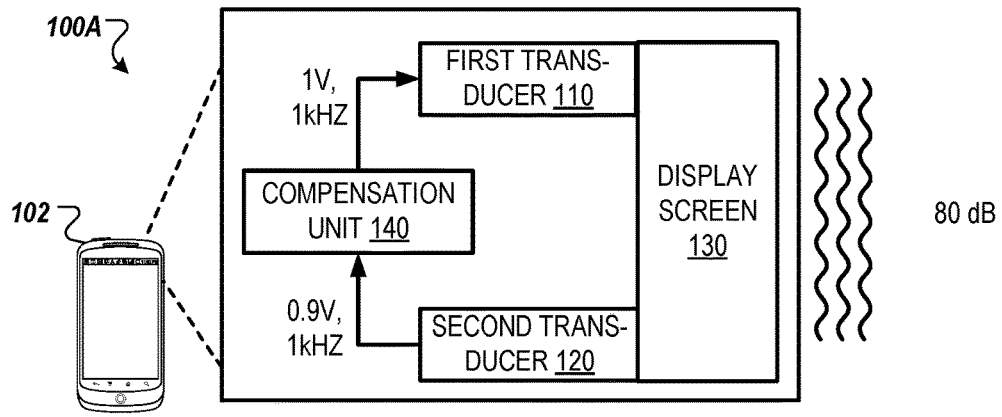
FIGS. 1A-1C are conceptual diagrams of a system that modifies movement of a display screen to compensate for changes in spread of movement across the display screen.
Figure 1B:
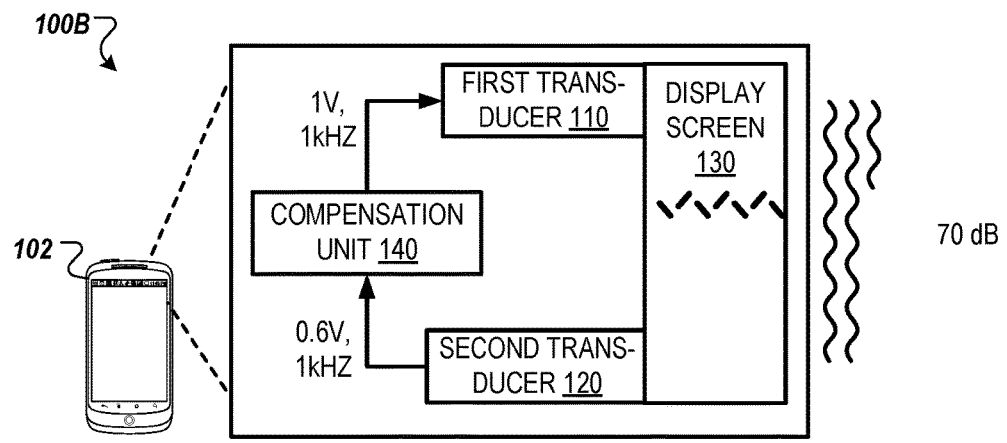
Figure 1C:
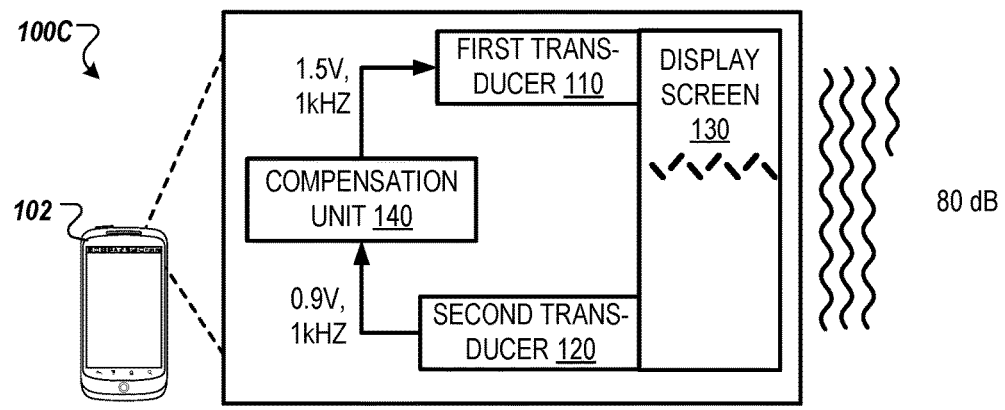

FIGS. 1A-1C are conceptual diagrams of systems 100A, 100B, 100C that adjust (e.g., compensate) movement of a display screen 130 to compensate for changes in the spread of movement across the display screen 130. FIG. 1A illustrates how the system 100A operates before the display screen 130 is cracked. FIG. 1B illustrates how the system 100B operates after the display screen 130 is cracked and before movement of the display screen 130 is compensated for the crack. FIG. 1C illustrates how the system 100C operates after movement of the display screen 130 is compensated for the crack in the display screen 130.

In more detail, FIGS. 1A-1C illustrate a mobile computing device 102 that includes a first transducer 110, a second transducer 120, the display screen 130, and a compensation unit 140. The first transducer 110 is mechanically coupled to the display screen 130 at a first portion of the display screen and may move the first portion of the display screen. For example, the first transducer 110 may be attached to the interior side of a top of the display screen 130 and movement of the first transducer 110 may directly cause force to be applied to the top of the display screen 130, and the force may move the top of the display screen 130.

The second transducer 120 is mechanically coupled to the display screen 130 at a second portion of the display screen 130 and may detect movement of the display screen 130 at the second portion that is caused by movement of the first portion of the display screen. For example, the second transducer 120 may be attached to the interior side of a bottom of the display screen 130 and movement of the second portion of the display screen may move the second transducer 120.

The compensation unit 140 provides a movement signal to the first transducer 110 and receives a sensed movement signal from the second transducer 120. The movement signal may be an electronic signal that drives the first transducer 110 to move the first portion of the display screen 130 and the sensed movement signal may be an electronic signal generated by the second transducer 120 in response to movement of the second portion of the display screen 130.

FIG. 1A illustrates how the system 100A operates before the display screen 130 is cracked. The compensation unit 140 provides a movement signal of 1V (Volts) at 1 kHz (kiloHertz) to the first transducer 110. The voltage of the movement signal may correspond to amplitude of movement and the frequency of the movement signal may correspond to frequency of movement.

The first transducer 110 then moves the first portion of the display screen 130 in accordance with the movement signal and the movement of the display screen 130 produces a sound at 80 dB (decibels). In this manner the electrical signal provided to the transducer is converted into mechanical movement of the display screen 130 and then the air. The second transducer 120 then detects the movement of the display screen 130 at the second portion and provides a sensed movement signal of 0.9V at 1 kHz. In this manner the mechanical movement of the display screen 130 is converted into an electrical signal.

FIG. 1B illustrates how the system 100B operates after the display screen 130 is cracked and before movement of the display screen 130 is compensated for the crack. The crack in the display screen 130 may be between the first portion and second portion of the display screen 130 so that it reduces the transfer of movement from the first portion to the second portion, or in other words, reduces the spread of movement from the first portion to the second portion.

The compensation unit 140 provides a movement signal of 1V at 1 kHz to the first transducer 110. The first transducer 110 then moves the first portion of the display screen 130 in accordance with the movement signal and the movement of the display screen 130 produces a sound at 70 dB. The second transducer 120 detects movement of the display screen 130 at the second portion and provides a sensed movement signal of 0.6V at 1 kHz, which corresponds to a reduced movement of the second portion due to the reduced transfer of movement.

FIG. 1C illustrates how the system 100C operates after movement of the display screen 130 is compensated for the crack in the display screen 130. The compensation unit 140 may compensate for the crack in the display screen 130 by increasing the voltage of a movement signal to the first transducer 110 from 1V at 1 kHz to 1.5V at 1 kHz.

The first transducer 110 then moves the first portion of the display screen 130 at a greater amplitude in accordance with the movement signal and the movement of the display screen 130 produces a sound at 80 dB, the original level before the display screen 130 was cracked. The second transducer 120 detects movement of the display screen 130 at the second portion and provides a sensed movement signal of 0.9V at 1 kHz, which corresponds to the movement of the second portion before the display screen 130 was cracked.

While movement of the display screen 130 is primarily described herein to produce sound, the compensation unit 140 may similarly compensate movement of a display screen 130 for changes in the spread of movement across the display screen to produce more consistent haptic feedback. For example, the movement signal provided to the first transducer 110 may have greater amplitudes and lower frequencies when the display screen 130 is being used to provide haptic feedback.

Additionally or alternatively, while the first transducer 110 is described as moving the display screen 130 and the second transducer 120 is described as detecting movement of the display screen 130, the roles of the first transducer 110 and second transducer 120 may be reversed. For example, the second transducer 120 may move the display screen 130 and the first transducer 110 may detect movement of the display screen 130.

FIG. 2 is a block diagram 200 of a compensation unit 202 that adjusts (e.g., compensates) movement of a display screen to compensate for changes in the spread of movement across the display screen. The compensation unit 202 includes a characteristic determinator 210 that determines a current mechanical characteristic 216 exhibited by the display screen, a compensation determinator 220 that determines a compensation characteristic 224, and a compensation engine 230 that compensates movement using the compensation characteristic 224. In some implementations, the compensation unit 202 may be the compensation unit 140 of FIGS. 1A-1C.

The characteristic determinator 210 obtains a movement test signal 212. The movement test signal 212 may be an electric signal that is provided to a first transducer to drive the first transducer to move a first portion of the display screen as part of determining whether to compensate movement. For example, the movement test signal 212 may be an electric signal that is 1V at 1 kHz that causes the display screen to produce sound that is inaudible to a user.

The movement test signal 212 may have been previously used to drive a display screen to determine a reference characteristic 222 of the display screen. The reference characteristic 222 of the display screen may describe a mechanical characteristic that a reference display screen exhibits. For example, the reference characteristic 222 may describe that a display screen of an undamaged and unmodified mobile computing device transfers 90% of the amplitude of movement at a first portion of the display screen to a second portion of the display screen when a first transducer is driven with the movement test signal 212. In some examples, the reference characteristic is pre-stored on the computing device at a time of manufacturing, as an expected reference characteristic of the computing device (and other computing devices of a same or similar type).

The characteristic determinator 210 also obtains a sensed test signal 214. The sensed test signal 214 may be an electric signal generated by a second transducer from movement of the display screen at a second portion caused by movement of a first portion of the display screen caused by the first transducer being driven with the movement test signal.

The characteristic determinator 210 then determines a current mechanical characteristic 216 exhibited by the display screen using the movement test signal 212 and the sensed test signal 214. The current mechanical characteristic 216 may reflect the transfer of movement across the display screen that is currently exhibited by the display screen.

For example, the characteristic determinator 210 may determine the current mechanical characteristic 216 exhibited by the display screen is that movement at the first portion of the display screen is transferred to the second portion of the display screen with 80% amplitude by comparing a movement test signal 212 with 1V and a sensed test signal of 0.8V. In another example, the characteristic determinator 210 may determine that movement at the first portion of the display screen may transfer to the second portion of the display screen with 50% amplitude and a phase shift of 90°.

The compensation determinator 220 may obtain the current mechanical characteristic 216 exhibited by the display screen from the characteristic determinator 210 and obtain the reference characteristic 222 exhibited by the display screen to determine a compensation characteristic 224. The compensation characteristic 224 may describe how a movement signal that drives a first transducer may be modified so that the sound produced by movement of the display screen while the display screen exhibits the current mechanical characteristic 216 is more similar to sound produced by movement of the display screen with the movement signal while the display screen exhibits the reference mechanical characteristic.

For example, the compensation determinator 220 may obtain a current mechanical characteristic 216 that reflects a transfer of movement of 80% amplitude from a first portion of the display screen to a second portion of the display screen, a reference characteristic 222 that reflects a transfer of movement of 90% amplitude from a first portion of the display screen to a second portion of the display screen, and determine a compensation characteristic of increasing amplitude of a movement signal by 12% (e.g., overall or at the specific frequency at which the amplitude decreased).

The compensation engine 230 may obtain the compensation characteristic 224, from the compensation determinator 220, obtain a movement signal 232 to drive a first transducer to produce sound audible to a user, and provide a compensated signal 234 for the first transducer. The compensated signal 234 may be an electric signal provided to the first transducer for the display screen to produce a sound that is similar to a sound produced by the display screen when the first transducer was driven using the movement signal 232 while exhibiting the reference characteristic 222.

Figure 3:
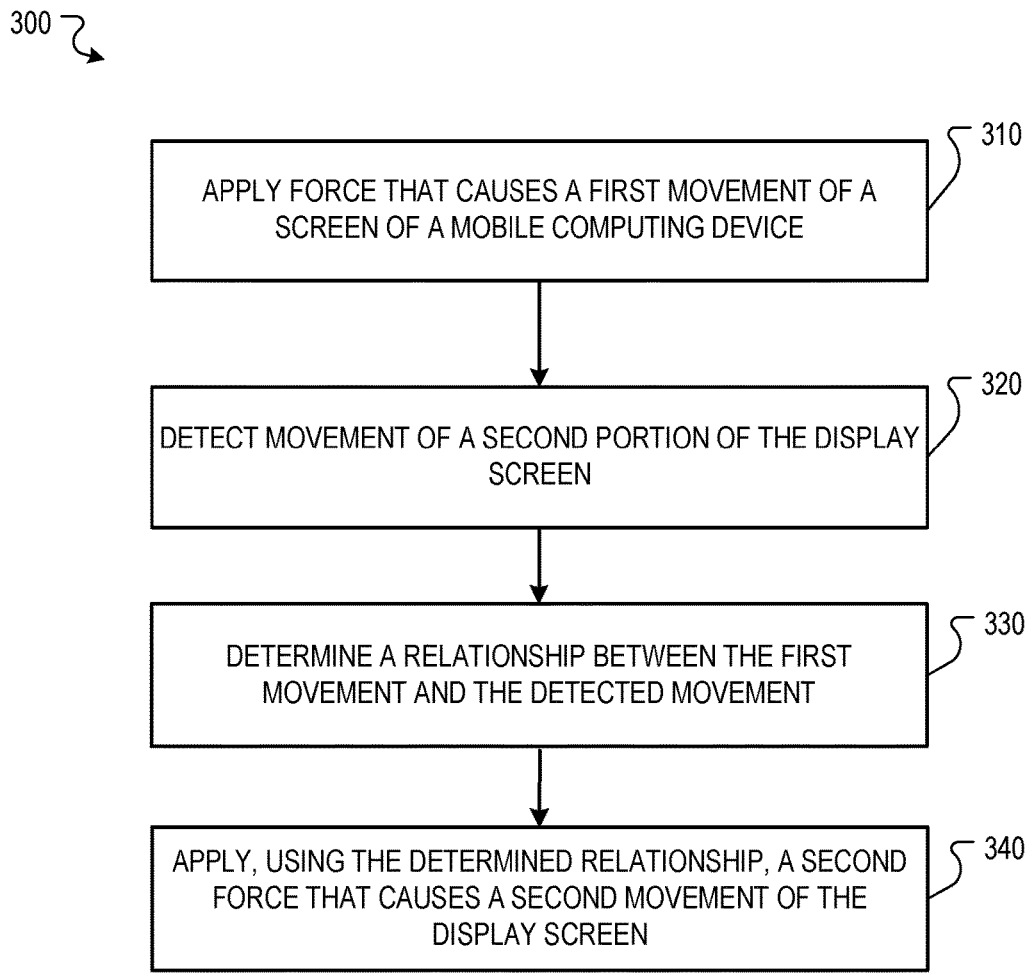
FIG. 3 is a flow diagram that illustrates an example of a process that modifies movement of a display screen to compensate for changes in the spread of movement across the display screen.

FIG. 3 is a flow diagram that illustrates an example of a process 300 that compensates movement of a display screen for changes in the spread of movement across the display screen. The operations of the process 400 may be performed by one or more computing systems, such as the mobile computing device 102 of FIGS. 1A-1C and the compensation unit 202 of FIG. 2.

The process 300 includes applying force that causes a first movement of a screen of a mobile computing device (310). For example, the compensation unit 140 may provide a movement test signal to the first transducer 110 and the first transducer 110 may then move a first portion of the display screen 130 in accordance with the movement test signal. The first transducer may be a piezoelectric transducer or some other device that converts an electrical signal to movement. For example, the first transducer may convert an electrical charge into physical movement.

The force applied by the first transducer 110 may cause the display screen to vibrate at a particular frequency and a particular amplitude. For example, the first transducer 110 may receive a movement test signal of 0.5V at 500 Hz and in response, apply a force that vibrates a first portion of the display screen 130 with an amplitude of 0.5V and a frequency of 500 Hz.

The process 300 includes detecting movement of a second portion the screen (320). For example, the second transducer 120 may generate a sensed movement signal of 0.25V at 500 Hz in response to vibrations at a second portion of the display screen 130, with those vibrations having been caused by vibration of the first portion of the display screen 130 by the first transducer 110. The second transducer may be a piezoelectric transducer. For example, the second transducer may convert physical movement into an electric charge.

The process 300 includes determining a relationship between the first movement and the detected movement. (330). For example, the compensation unit 140 or characteristic determinator 210 may obtain a movement test signal of 0.5V at 500 Hz and a sensed test signal of 0.25V at 500 Hz and determine that 50% of amplitude of movement at 500 Hz at the first portion of the display screen 130 is transferred to the second portion of the display screen 130.

Determining a relationship between the first movement caused at the first portion of the display screen by the first transducer and the movement detected at the second portion of the display screen by the second transducer may include determining a relationship between an electric signal input to the first transducer and an electric signal generated by the second transducer. For example, a processor of a mobile computing device may determine that an electric signal of 0.5V at 500 Hz was input to the first transducer 110 and that an electric signal of 0.25V at 500 Hz was generated by the second transducer 120.

Determining a relationship between the first movement caused at the first portion of the display screen by the first transducer and the movement detected at the second portion of the display screen by the second transducer may include determining a transfer function that describes a transfer of movement at the first portion of the display screen to the second portion of the display screen. For example, the compensation unit 140 or characteristic determinator 210 may obtain multiple movement test signals, at one or more of different amplitudes and one or more different frequencies, and obtain multiple sensed test signals generated by the second transducer 120 in response to the first transducer 110 being driven with the multiple movement test signals, and from the multiple test signals and multiple sensed test signals, determine a transfer function that describes a sensed test signal as a function of a movement test signal.

The transfer function may describe an expected amplitude, frequency, and phase of movement at the second portion in response to a given amplitude, frequency, and phase of movement at the first portion. For example, the transfer function may describe that an expected amplitude of movement at a second portion of the display screen 130 is 75% of the amplitude of movement at a first portion of the display screen 130, an expected frequency of movement at the second portion of the display screen 130 is the same as the frequency of movement at the first portion of the display screen 130, and an expected phase of movement at the second portion of the display screen 130 is 90° of a phase of movement at the first portion of the display screen 130.

The process 300 includes applying, using the determined relationship, a second force that causes a second movement of the display screen (340). For example, the compensation unit 140 or compensation engine 230 may use a determined relationship of only 50% of movement transferring from a first portion of a display screen to a second portion of a display screen instead of 75% of movement transferring to determine to increase an amplitude of movement signals to the first transducer 110 by 50% which may increase the second force by 50%.

Applying a second force that causes a second movement of the display screen by using the determined relationship may include obtaining a reference transfer function that describes a transfer of movement at a first portion of a reference display screen to a second portion of the reference display screen, determining a compensation function that compensates for a difference between the transfer function and the reference function, and moving the display screen with the first transducer based at least on the compensation function.

For example, the compensation unit 140 may obtain a reference transfer function of 75%, a current transfer function of 50%, determine a compensation function of increasing amplitude by 50%, and increase amplitude of movement signals to the first transducer by 50%.

Applying the second force based at least on the compensation function may include obtaining a movement signal, generating a compensated movement signal from the movement signal in accordance with the compensation function, and moving the display screen with the transducer in accordance with the compensated movement signal. For example, the compensation unit 140 or compensation engine 230 may obtain a movement signal of 5V at 500 Hz, generating a compensated movement signal of 7.5V at 500 Hz by increasing the amplitude of the 5V at 500 Hz movement signal by a compensation function of increasing amplitude by 50%, and moving the display screen with the first transducer 110 using the compensated movement signal of 7.5V at 500 Hz.

The process 300 may include obtaining the reference transfer function before applying the first force. For example, the compensation unit 140 may obtain the reference transfer function by determining mechanical characteristics exhibited by the display screen 130 when the mobile computing device 102 is tested at a manufacturing factory before being sold. In another example, the compensation unit 140 may obtain the reference transfer function from a server before moving the display screen to produce a sound audible to a user.

The process 300 may be performed in response to determining to provide a perceivable output to a user of the mobile computing device through the first transducer and, in response to determining to provide a perceivable output to a user of the mobile computing device through the first transducer, applying the first force that causes a first movement of the first portion of the display screen is in response to determining to provide the perceivable output to the user of the mobile computing device through the first transducer. For example, compensation unit 140 may detect a movement signal of 2V at 4 kHz is to be provided to the first transducer 110 to produce a sound audible to a user and, in response, provide a movement test signal of 1V at 250 Hz to the first transducer that would not produce a sound audible to a user, determine a compensation characteristic of increasing an amplitude by 100% from the movement test signal, generate a compensated movement signal of 4V at 4 Khz from the movement signal of 2V at 4 kHz and compensation characteristic of increasing an amplitude by 100%, and provide the compensated movement signal to the first transducer 110 instead of providing the movement.

The process 300 may be performed each time before providing a perceivable output to a user of the mobile computing device through the first transducer. Additionally or alternatively, the process 300 may be performed at period intervals, e.g., every hour, every day, every week, etc. The determination of the mechanical characteristics exhibited by the display screen may be performed during sound or haptic output provided in response to a typical request (e.g., a vibration of the screen in response to a user pressing the screen).

In some implementations, the compensation unit 140 or compensation engine 230 may not compensate movement test signals. For example, the compensation unit 140 may compensate movement signals intended to produce output perceivable to a user by increasing amplitudes of movement signals by 100% but not increase amplitudes of movement test signals that are not intended to produce output perceivable to the user and used to determine whether to compensate movement signals intended to produce output perceivable to a user.

The process 300 may include determining whether a difference between the mechanical characteristic and a reference mechanical characteristic satisfies a threshold and, in response to determining whether a difference between the mechanical characteristic and a reference mechanical characteristic satisfies a threshold, providing an indication or an alert that the display screen is damaged. For example, the compensation unit 140 may determine that an amplitude increase is greater than a 150% threshold of and, in response, provide a visual indication on the display screen that includes the text "Warning, your screen is heavily damaged and sound production may be inaccurate. Replacing your screen is recommended." An audible indication may also be provided. In other examples, an indication may be provided to another computing system for storage.

Figure 4:
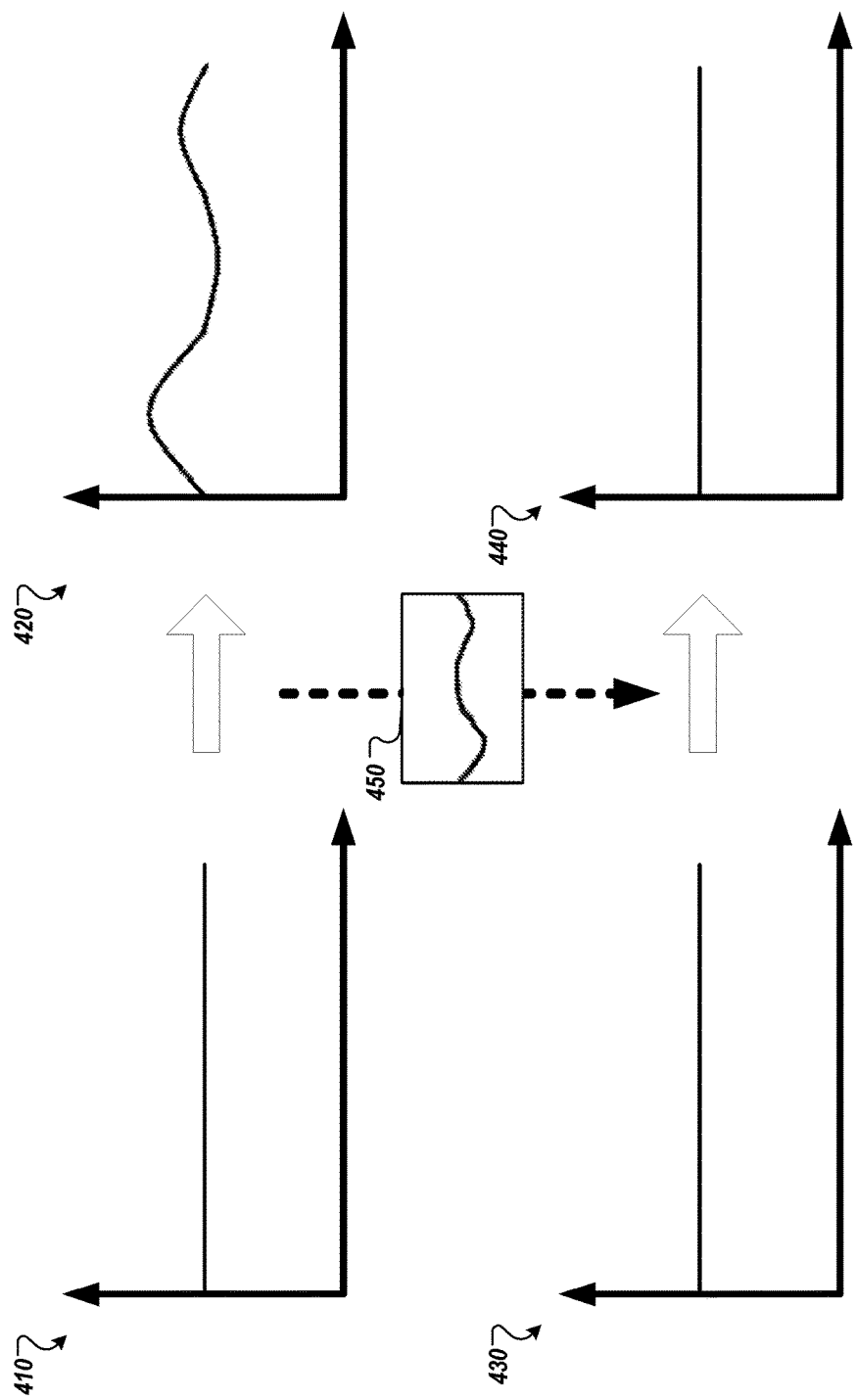
FIG. 4 is a conceptual diagram of a determination of a multi-frequency transfer function and an application of that transfer function to a signal.

FIG. 4 is a conceptual diagram of a determination of a multi-frequency transfer function and an application of that transfer function to a signal. This example represents how the technologies described in this document may be used to compensate for complex deviations in a signal (e.g., a haptic feedback being distorted in multiple frequencies due the presence of cracks and/or a case and/or a screen protector).

In this example, the frequency components of a signal provided to or output by an output transducer (e.g., first transducer 110) is represented by output frequency spectrum 410. The signal represented at 410 is a white noise signal that has the same amplitude across a wide range of frequencies. In other examples, the signal is an impulse signal or a signal that performs a frequency sweep, or some other signal of known characteristics at known frequencies. This signal is distorted across multiple frequencies in different manners, as illustrated by the sensed frequency spectrum 420, which represents the frequency components of a signal sensed by an input transducer (e.g., second transducer 120).

As shown in this illustration, some frequencies are sensed at an increased amplitude and some frequencies are sensed at a decreased amplitude. Using the output frequency spectrum 410 and the sensed frequency spectrum 420, a computing system may determine the transfer function 450. The transfer function 440 may include a mathematical representation of a manner in which to modify a signal. In this case, it is a mathematical representation of a manner in which to modify a signal in an attempt to neutralize properties of a computing device that caused the output signal to result in a different sensed signal. Output frequency spectrum 430 and sensed frequency spectrum 440 illustrate how an input signal can be modified by a transfer function to compensate for distortions in multiple frequencies. While FIG. 4 illustrates the output frequency spectrum 430 appearing similar to the white noise signal provided in output frequency spectrum 410, once the transfer function 450 is determined using the output frequency spectrum 410 the output frequency spectrum 430 may be a different signal. For example, output frequency spectrum 410 may be a white noise signal that is provided for calibration purposes and output frequency spectrum 430 may be a later signal that is calibrated using the transfer function 450 to produce sound as originally intended to be heard by a user.

The diagram of FIG. 4 is a simplified example of the technologies discussed in this disclosure in some respects. For example, the diagram does not account for reference transfer functions. For example, it may be that a sensed signal is distorted due to the structural characteristics of computing device that is not damaged or modified in any way. As such, the multi-frequency examples presented in FIG. 4 would also apply to circumstances in which a sensed frequency spectrum was compared to a reference frequency spectrum, or the determined transfer function 450 was compared to a reference transfer function. Still, it is reasonable to adjust a signal output by a transducer using a transfer function (e.g., transfer function 450) to attempt to neutralize the structural characteristics of a computing device, whether or not there has been damage or modifications made to the computing device. As discussed throughout this disclosure, the modifications to the input signal may also include phase modifications.

In some examples, the computing device may include a single transducer that performs the operations described herein using a single transducer. For example, the computing device may send a signal to a transducer to cause that transducer to vibrate a component of the computing device (e.g., the display screen or a component connected to the display screen directly or through one or more intervening components). The computing device may be able to analyze performance of the transducer to determine how the transducer actually vibrates the component of the computing device. For example, the same 1V, 1 kHz signal may result in different reflected frequencies at the location of the transducer based on various characteristics of the computing device, such as whether the display screen is cracked and whether the computing device is enclosed in a case. As such, the transducer may serve as both an output device and a sensing device.

In some examples the transducer concurrently outputs a signal and senses the characteristics of that output signal and how it may be affected by the physical properties of the computing device. In some examples, the computing device can monitor the characteristics of the output signal by monitoring how the impedance of the output signal changes or does not change. In some examples, the computing device alternates between a mode in which it outputs a signal and a mode in which it senses reflective vibrations that were caused by the output signal. In this manner, the computing device may use a single transducer to output a signal and sense physical characteristics of the computing device.

In some implementations, the computing device may include multiple transducers outputting signals at a same time and a single transducer sensing the output signals, and the computing device may generate transfer functions for the multiple transducers based on the sensed signals. In some examples, the computing device may include a single transducer outputting a signal and multiple transducers sensing the output signal, and the computing device may generate a transfer function for the single transducer using the multiple transducers sensing the output signal. In some examples, the computing device may include multiple output transducers outputting multiple signals and multiple sensing transducers sensing the multiple signals, and the computing device may generate multiple transfer functions for the multiple output transducers using the multiple sensing transducers to sense the multiple signals.

Figure 5:
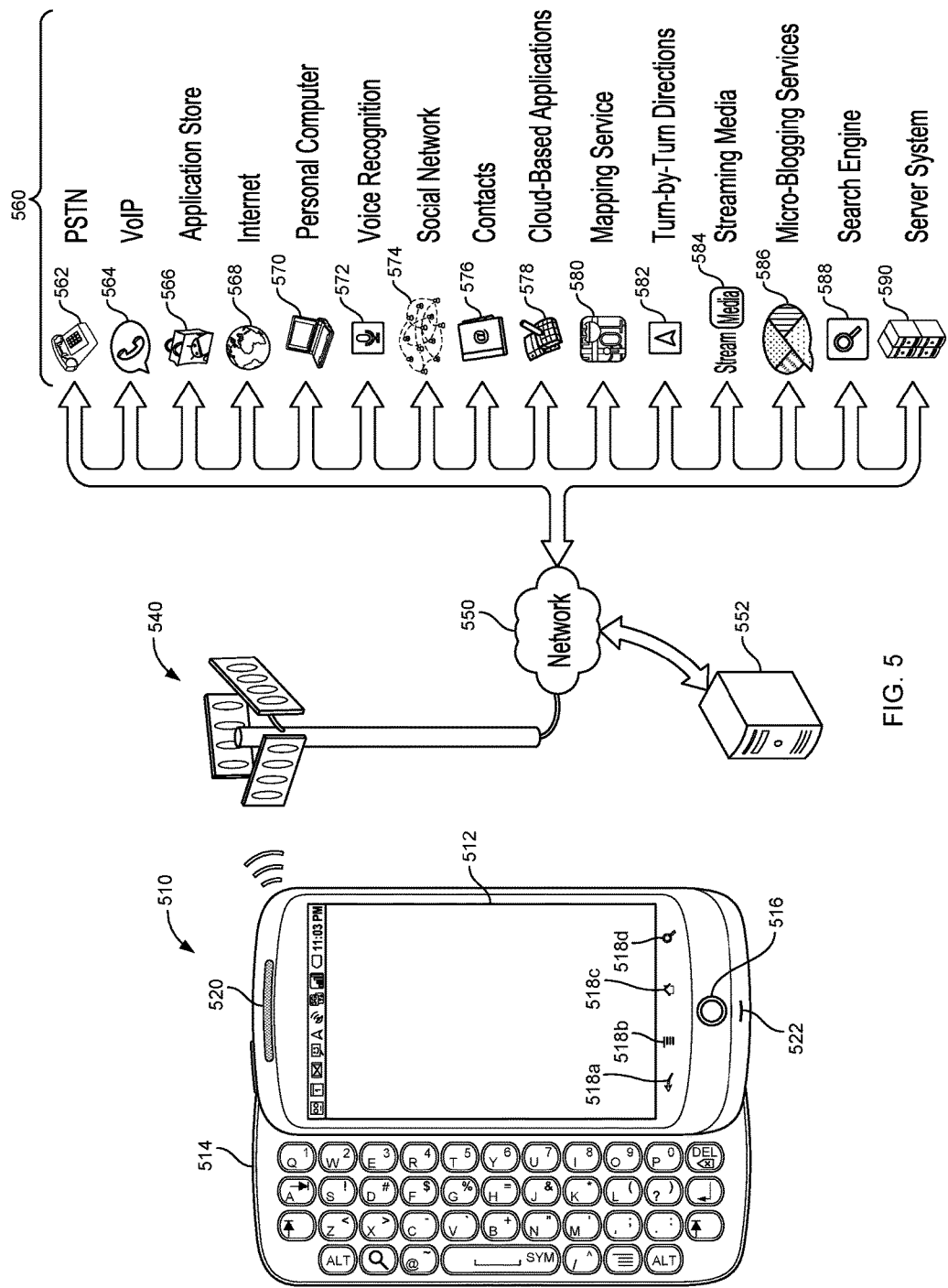
FIG. 5 is a conceptual diagram of a system that may be used to implement the systems and methods described in this document.

Referring now to FIG. 5, a conceptual diagram of a system that may be used to implement the systems and methods described in this document is illustrated. In the system, mobile computing device 510 can wirelessly communicate with base station 540, which can provide the mobile computing device wireless access to numerous hosted services 560 through a network 550.

In this illustration, the mobile computing device 510 is depicted as a handheld mobile telephone (e.g., a smartphone, or an application telephone) that includes a touchscreen display device 512 for presenting content to a user of the mobile computing device 510 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 514, physical buttons, trackballs, accelerometers, gyroscopes, and magnetometers).

Example visual output mechanism in the form of display device 512 may take the form of a display with resistive or capacitive touch capabilities. The display device may be for displaying video, graphics, images, and text, and for coordinating user touch input locations with the location of displayed information so that the device 510 can associate user contact at a location of a displayed item with the item. The mobile computing device 510 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 514, which may be a full qwerty keyboard or a traditional keypad that includes keys for the digits '0-9', '*', and '#.' The keyboard 514 receives input when a user physically contacts or depresses a keyboard key. User manipulation of a trackball 516 or interaction with a track pad enables the user to supply directional and rate of movement information to the mobile computing device 510 (e.g., to manipulate a position of a cursor on the display device 512).

The mobile computing device 510 may be able to determine a position of physical contact with the touchscreen display device 512 (e.g., a position of contact by a finger or a stylus). Using the touchscreen 512, various "virtual" input mechanisms may be produced, where a user interacts with a graphical user interface element depicted on the touchscreen 512 by contacting the graphical user interface element. An example of a "virtual" input mechanism is a "software keyboard," where a keyboard is displayed on the touchscreen and a user selects keys by pressing a region of the touchscreen 512 that corresponds to each key.

The mobile computing device 510 may include mechanical or touch sensitive buttons 518a-d. Additionally, the mobile computing device may include buttons for adjusting volume output by the one or more speakers 520, and a button for turning the mobile computing device on or off. A microphone 522 allows the mobile computing device 510 to convert audible sounds into an electrical signal that may be digitally encoded and stored in computer-readable memory, or transmitted to another computing device. The mobile computing device 510 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 510 may present a graphical user interface with the touchscreen 512. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 504. User-selection of the button may invoke the pre-defined action.

In some examples, the operating system provides a "desktop" graphical user interface that is displayed after turning on the mobile computing device 510, after activating the mobile computing device 510 from a sleep state, after "unlocking" the mobile computing device 510, or after receiving user-selection of the "home" button 518c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 510 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 512 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 510 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 510 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 510. The mobile device 510 may include a digital camera sensor, and corresponding image and video capture and editing software. An internet browser may enable the user to view content from a web page by typing in an addresses corresponding to the web page or selecting a link to the web page.

The mobile computing device 510 may include an antenna to wirelessly communicate information with the base station 540. The base station 540 may be one of many base stations in a collection of base stations (e.g., a mobile telephone cellular network) that enables the mobile computing device 510 to maintain communication with a network 550 as the mobile computing device is geographically moved. The computing device 510 may alternatively or additionally communicate with the network 550 through a Wi-Fi router or a wired connection (e.g., ETHERNET, USB, or FIREWIRE). The computing device 510 may also wirelessly communicate with other computing devices using BLUETOOTH protocols, or may employ an ad-hoc wireless network.

A service provider that operates the network of base stations may connect the mobile computing device 510 to the network 550 to enable communication between the mobile computing device 510 and other computing systems that provide services 560. Although the services 560 may be provided over different networks (e.g., the service provider's internal network, the Public Switched Telephone Network, and the Internet), network 550 is illustrated as a single network. The service provider may operate a server system 552 that routes information packets and voice data between the mobile computing device 510 and computing systems associated with the services 560.

The network 550 may connect the mobile computing device 510 to the Public Switched Telephone Network (PSTN) 562 in order to establish voice or fax communication between the mobile computing device 510 and another computing device. For example, the service provider server system 552 may receive an indication from the PSTN 562 of an incoming call for the mobile computing device 510. Conversely, the mobile computing device 510 may send a communication to the service provider server system 552 initiating a telephone call using a telephone number that is associated with a device accessible through the PSTN 562.

The network 550 may connect the mobile computing device 510 with a Voice over Internet Protocol (VoIP) service 564 that routes voice communications over an IP network, as opposed to the PSTN. For example, a user of the mobile computing device 510 may invoke a VoIP application and initiate a call using the program. The service provider server system 552 may forward voice data from the call to a VoIP service, which may route the call over the internet to a corresponding computing device, potentially using the PSTN for a final leg of the connection.

An application store 566 may provide a user of the mobile computing device 510 the ability to browse a list of remotely stored application programs that the user may download over the network 550 and install on the mobile computing device 510. The application store 566 may serve as a repository of applications developed by third-party application developers. An application program that is installed on the mobile computing device 510 may be able to communicate over the network 550 with server systems that are designated for the application program. For example, a VoIP application program may be downloaded from the Application Store 566, enabling the user to communicate with the VoIP service 564.

The mobile computing device 510 may access content on the internet 568 through network 550. For example, a user of the mobile computing device 510 may invoke a web browser application that requests data from remote computing devices that are accessible at designated universal resource locations. In various examples, some of the services 560 are accessible over the internet.

The mobile computing device may communicate with a personal computer 570. For example, the personal computer 570 may be the home computer for a user of the mobile computing device 510. Thus, the user may be able to stream media from his personal computer 570. The user may also view the file structure of his personal computer 570, and transmit selected documents between the computerized devices.

A voice recognition service 572 may receive voice communication data recorded with the mobile computing device's microphone 522, and translate the voice communication into corresponding textual data. In some examples, the translated text is provided to a search engine as a web query, and responsive search engine search results are transmitted to the mobile computing device 510.

The mobile computing device 510 may communicate with a social network 574. The social network may include numerous members, some of which have agreed to be related as acquaintances. Application programs on the mobile computing device 510 may access the social network 574 to retrieve information based on the acquaintances of the user of the mobile computing device. For example, an "address book" application program may retrieve telephone numbers for the user's acquaintances. In various examples, content may be delivered to the mobile computing device 510 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 510 may access a personal set of contacts 576 through network 550. Each contact may identify an individual and include information about that individual (e.g., a phone number, an email address, and a birthday). Because the set of contacts is hosted remotely to the mobile computing device 510, the user may access and maintain the contacts 576 across several devices as a common set of contacts.

The mobile computing device 510 may access cloud-based application programs 578. Cloud-computing provides application programs (e.g., a word processor or an email program) that are hosted remotely from the mobile computing device 510, and may be accessed by the device 510 using a web browser or a dedicated program. Example cloud-based application programs include GOOGLE DOCS word processor and spreadsheet service, GOOGLE GMAIL webmail service, and PICASA picture manager.

Mapping service 580 can provide the mobile computing device 510 with street maps, route planning information, and satellite images. An example mapping service is GOOGLE MAPS. The mapping service 580 may also receive queries and return location-specific results. For example, the mobile computing device 510 may send an estimated location of the mobile computing device and a user-entered query for "pizza places" to the mapping service 580. The mapping service 580 may return a street map with "markers" superimposed on the map that identify geographical locations of nearby "pizza places."

Turn-by-turn service 582 may provide the mobile computing device 510 with turn-by-turn directions to a user-supplied destination. For example, the turn-by-turn service 582 may stream to device 510 a street-level view of an estimated location of the device, along with data for providing audio commands and superimposing arrows that direct a user of the device 510 to the destination.

Various forms of streaming media 584 may be requested by the mobile computing device 510. For example, computing device 510 may request a stream for a pre-recorded video file, a live television program, or a live radio program. Example services that provide streaming media include YOUTUBE and PANDORA.

A micro-blogging service 586 may receive from the mobile computing device 510 a user-input post that does not identify recipients of the post. The micro-blogging service 586 may disseminate the post to other members of the micro-blogging service 586 that agreed to subscribe to the user.

A search engine 588 may receive user-entered textual or verbal queries from the mobile computing device 510, determine a set of internet-accessible documents that are responsive to the query, and provide to the device 510 information to display a list of search results for the responsive documents. In examples where a verbal query is received, the voice recognition service 572 may translate the received audio into a textual query that is sent to the search engine.

These and other services may be implemented in a server system 590. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 6:
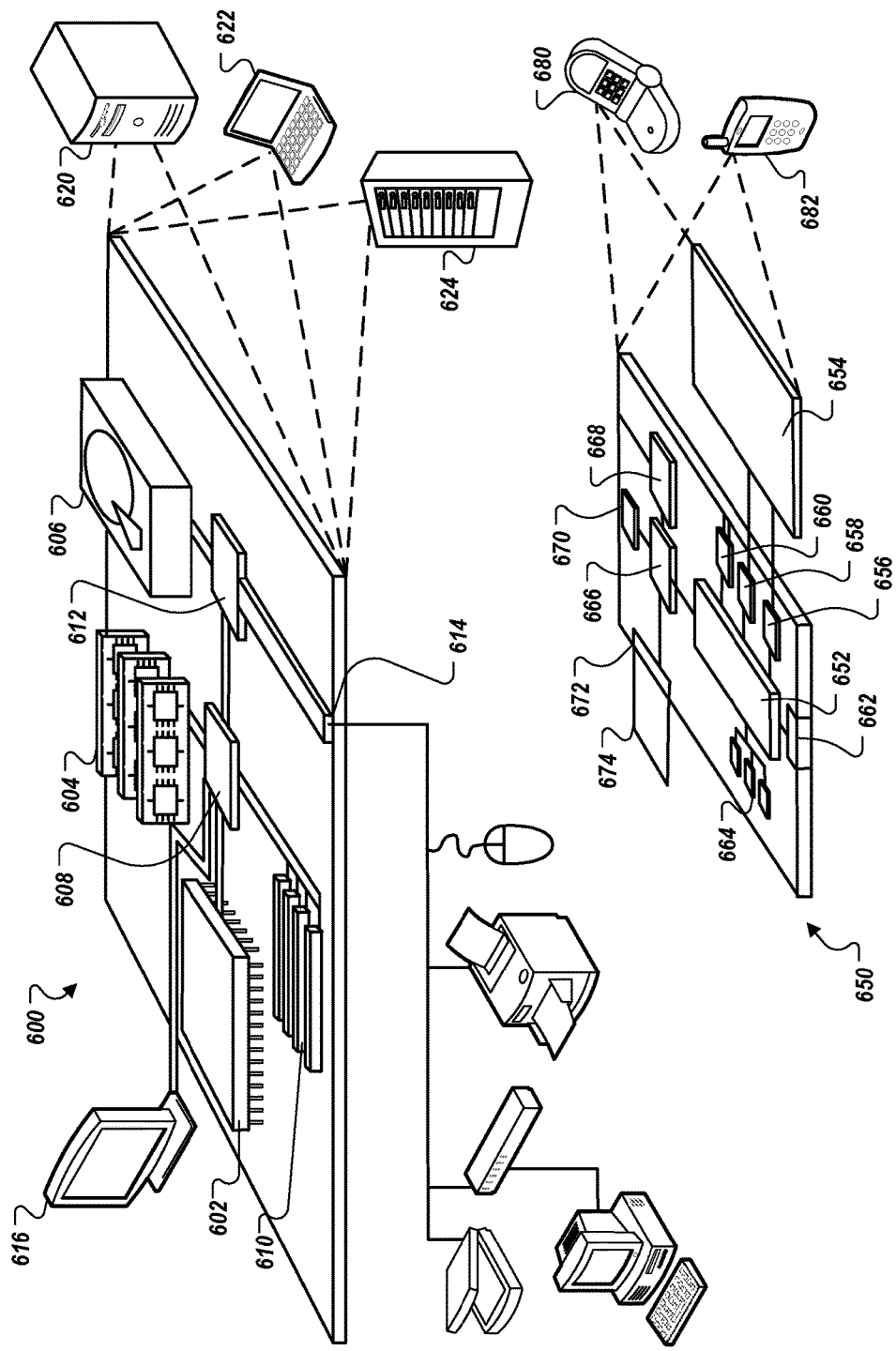
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low speed controller 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provided, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
  applying, by a first transducer that is mechanically coupled to a first portion of a display screen of a mobile computing device, a first force that causes a first movement of the first portion of the display screen;
  detecting, by a second transducer that is mechanically coupled to a second portion of the display screen, movement of the second portion of the display screen, the second portion of the display screen being different than the first portion of the display screen;

determining a transfer function that describes a transfer of movement from the first portion of the display screen to the second portion of the display screen based on the first movement caused at the first portion of the display screen by the first transducer and the movement detected at the second portion of the display screen by the second transducer;

obtaining, from a storage of the mobile computing device, a reference transfer function that describes a transfer of movement from a first portion of a reference display screen to a second portion of the reference display screen;

determining a difference between the transfer function and the reference transfer function; and applying, by the first transducer, a second force that causes a second movement of the first portion of the display screen, the second force being determined by a computing system of the mobile computing device based on the difference between the transfer function and the reference transfer function.

2. The method of claim 1, wherein:
the first transducer includes a first piezoelectric element that is mechanically coupled to the first portion of the display screen; and
the second transducer includes a second piezoelectric element that is mechanically coupled to the second portion of the display screen.

3. The method of claim 1, wherein applying, by a first transducer that is mechanically coupled to a first portion of a display screen of a mobile computing device, a first force that causes a first movement of the first portion of the display screen comprises:
applying a first force that causes the display screen to vibrate at a particular frequency and a particular amplitude.

4. The method of claim 1, wherein determining the transfer function that describes the transfer of movement from the first portion of the display screen to the second portion of the display screen comprises:
determining a transfer function that describes an expected amplitude, frequency, and phase of movement at the second portion in response to a given amplitude, frequency, and phase of movement at the first portion.

5. The method of claim 1, wherein applying, by the first transducer, a second force that causes a second movement of the first portion of the display screen, the second force being determined by a computing system of the mobile computing device based on the difference between the transfer function and the reference transfer function comprises:
determining a compensation function that compensates for the difference between the transfer function and the reference transfer function; and
applying the second force based at least on the compensation function.

6. The method of claim 5, wherein applying the second force based at least on the compensation function comprises:
obtaining a movement signal;
generating a compensated movement signal from the movement signal in accordance with the compensation function; and
applying the second force in accordance with the compensated movement signal.

7. The method of claim 5, comprising:
obtaining the reference transfer function before applying the first force.

8. The method of claim 1, comprising:
determining to provide a perceivable output to a user of the mobile computing device through the first transducer,
wherein applying the first force that causes a first movement of the first portion of the display screen is in response to determining to provide the perceivable output to the user of the mobile computing device through the first transducer.

9. The method of claim 1, wherein the reference display screen comprises the display screen before the first force was applied to the first portion of the display screen.

10. The method of claim 1, wherein the reference transfer function is stored in the storage of the mobile computing device in response to testing that occurred before the first force was applied to the first portion of the display screen.

11. A system comprising:
one or more processors;
a display screen;
a first transducer mechanically coupled to a first portion of the display screen;
a second transducer mechanically coupled to a second portion of the display screen; and
one or more storage devices storing instructions that are operable, when executed by the one or more computers, to cause the one or more processors perform operations comprising:
applying, by the first transducer that is mechanically coupled to the first portion of the display screen of a mobile computing device, a first force that causes a first movement of the first portion of the display screen;
detecting, by the second transducer that is mechanically coupled to the second portion of the display screen, movement of the second portion of the display screen, the second portion of the display screen being different than the first portion of the display screen;
determining a transfer function that describes a transfer of movement from the first portion of the display screen to the second portion of the display screen based on the first movement caused at the first portion of the display screen by the first transducer and the movement detected at the second portion of the display screen by the second transducer;
obtaining, from a storage of the mobile computing device, a reference transfer function that describes a transfer of movement from a first portion of a reference display screen to a second portion of the reference display screen;
determining a difference between the transfer function and the reference transfer function; and
applying, by the first transducer, a second force that causes a second movement of the first portion of the display screen, the second force being determined by a computing system of the mobile computing device based on the difference between the transfer function and the reference transfer function.

12. The system of claim 11, wherein:
the first transducer includes a first piezoelectric element that is mechanically coupled to the first portion of the display screen; and
the second transducer includes a second piezoelectric element that is mechanically coupled to the second portion of the display screen.

13. The system of claim 11, wherein applying, by a first transducer that is mechanically coupled to a first portion of a display screen of a mobile computing device, a first force that causes a first movement of the first portion of the display screen comprises:

applying a first force that causes the display screen to vibrate at a particular frequency and a particular amplitude.

14. The system of claim 11, wherein determining the transfer function that describes the transfer of movement from the first portion of the display screen to the second portion of the display screen comprises:

determining a transfer function that describes an expected amplitude, frequency, and phase of movement at the second portion in response to a given amplitude, frequency, and phase of movement at the first portion.

15. The system of claim 11, wherein applying, by the first transducer, a second force that causes a second movement of the first portion of the display screen, the second force being determined by a computing system of the mobile computing device based on the difference between the transfer function and the reference transfer function comprises:

determining a compensation function that compensates for the difference between the transfer function and the reference transfer function; and applying the second force based at least on the compensation function.

16. The system of claim 15, wherein applying the second force based at least on the compensation function comprises:

obtaining a movement signal;

generating a compensated movement signal from the movement signal in accordance with the compensation function; and applying the second force in accordance with the compensated movement signal.

17. The system of claim 15, the operations comprising:
obtaining the reference transfer function before applying the first force.

18. The system of claim 11, the operations comprising:
determining to provide a perceivable output to a user of the mobile computing device through the first transducer, wherein applying the first force that causes a first movement of the first portion of the display screen is in response to determining to provide the perceivable output to the user of the mobile computing device through the first transducer.

19. A non-transitory computer-readable medium storing instructions executable by one or more computers which, upon such execution, cause the one or more computers to perform operations comprising:

applying, by a first transducer that is mechanically coupled to a first portion of a display screen of a mobile computing device, a first force that causes a first movement of the first portion of the display screen;

detecting, by a second transducer that is mechanically coupled to a second portion of the display screen, movement of the second portion of the display screen, the second portion of the display screen being different than the first portion of the display screen;

determining a transfer function that describes a transfer of movement from the first portion of the display screen to the second portion of the display screen based on the first movement caused at the first portion of the display screen by the first transducer and the movement detected at the second portion of the display screen by the second transducer;

obtaining, from a storage of the mobile computing device, a reference transfer function that describes a transfer of movement from a first portion of a reference display screen to a second portion of the reference display screen;

determining a difference between the transfer function and the reference transfer function; and applying, by the first transducer, a second force that causes a second movement of the first portion of the display screen, the second force being determined by a computing system of the mobile computing device based on the difference between the transfer function and the reference transfer function.

\* \* \* \* \*

UNITED STATES PATENT AND TRADEMARK OFFICE
CERTIFICATE OF CORRECTION

PATENT NO.        : 10,423,229 B2                                       Page 1 of 1
APPLICATION NO.   : 15/679573
DATED             : September 24, 2019
INVENTOR(S)       : Michael Scot Pate It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 98 days.

Signed and Sealed this
Thirtieth Day of June, 2020

Andrei Iancu
*Director of the United States Patent and Trademark Office*